Feb. 16, 1926.
J. A. PORTIS
RADIUS ROD
Filed May 29, 1924
1,573,782
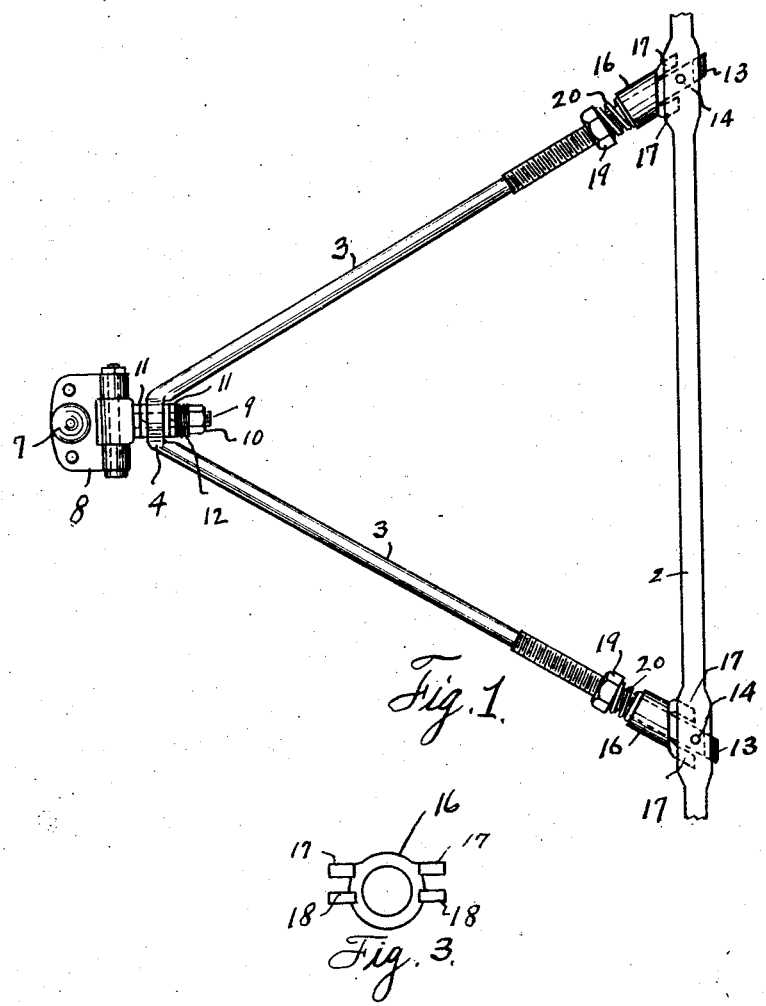
Fig. 1.
Fig. 3.
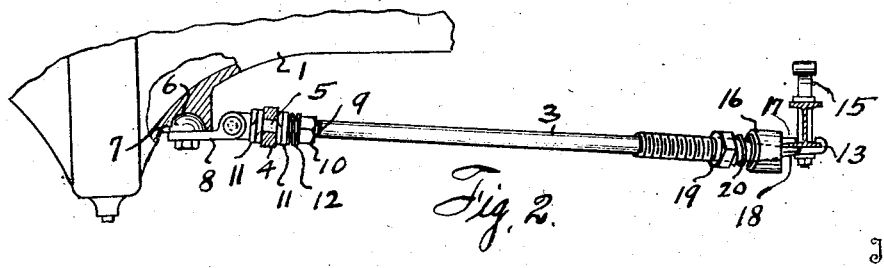
Fig. 2.
Inventor
James A Portis
By Harding Catlin
Attorneys Patented Feb. 16, 1926.

1,573,782

UNITED STATES PATENT OFFICE.

JAMES A. PORTIS, OF DAISETTA, TEXAS, ASSIGNOR OF ONE-FOURTH TO A. L. BARROW, OF LIBERTY COUNTY, TEXAS.

RADIUS ROD.

Application filed May 29, 1924. Serial No. 716,604.

*To all whom it may concern:*

Be it known that I, JAMES A. PORTIS, a citizen of the United States, residing at Daisetta, in the county of Liberty and State of Texas, have invented certain new and useful Improvements in a Radius Rod, of which the following is a specification.

This invention relates to new and useful improvements in a radius rod.

One object of the invention is to provide a radius rod, of the character described, specially designed for the purpose of anchoring the front axle of a motor vehicle in proper relation to the motor, and which has sufficient flexibility to permit the necessary relative movements of the connected parts.

Another object of the invention is to provide a radius rod, of the character described, which is of simple construction and yet strong and durable, and of the required flexibility.

With the above and other objects in view, the invention has particular relation to certain novel features of construction, operation and arrangement of parts, an example of which is given in this specification and illustrated in the accompanying drawings, wherein:—

Figure 1 is a plan view of the radius rod connected to the front axle.

Figure 2 is a side view partly in section, shown connected to the front axle and motor; and, Figure 3 shows a front end view of a clamp sleeve employed.

Referring now more particularly to the drawings, wherein like numerals of reference designate similar parts in each of the figures the numeral 1 designates the motor crank case and the numeral 2 designates the front axle of the vehicle which is of the form of an I-beam in cross section.

The radius rod has the forwardly diverging arms 3, 3, connected at their rear ends by a yoke 4 having the bearing 5 therethrough. The motor case 1 has a socket 6 in its underside into which the ball 7 on the upper side of the plate 8 fits. This plate is suitably bolted to the crank case. Hinged to this plate there is a pintle 9 which fits through the bearing 5, and whose forward end is threaded to receive the nut 10. On the pintle, on opposite sides of the yoke 4 there are suitable washers as 11, and between the front washers and the nut 10 there is a coil spring 12 forming a cushion.

The forward ends of the arms are flattened and fit under the front axle, and formed with upturned hooks 13, 13, which engage over the forwardly extending lower flange of said axle. The flattened portions have holes, as 14, to receive the shanks of the spring perches 15 whereby the front ends of said arms are secured to the axle.

There are sleeves, as 16, 16, fitted onto the arms 3, 3, and abutting against the rear side of the front axle. These sleeves have the forwardly projecting upper and lower fingers 17, 17, and 18, 18, respectively, which embrace the rear edge of the bottom flange, of the axle, as shown, and these sleeves are held in abutting position against the axle by means of the nuts 19, 19, screwed on said arms 3, with the coil spring washers 20, 20, interposed between said nuts and sleeves to lock the nuts against unscrewing and to prevent rattling of parts.

What I claim is:—

1. The combination with a motor and axle of a motor vehicle, of a radius rod formed with diverging arms, a yoke having a bearing connecting said arms at one end, a forwardly extending pintle hinged to the motor and working through said bearing, means preventing the detachment of the yoke from the pintle, integral hooks into which the other ends of the arms are formed, which engage with said axle and means for securing said hooks in engagement with said axle.

2. The combination with a motor and a flanged axle of a motor vehicle, of a radius rod formed with diverging arms, a yoke connecting said arms at one end and formed with a bearing, a forwardly extending pintle hinged to the motor and working through the bearing, means for preventing the detachment of the yoke from the pintle, hooks formed on the other ends of said arms which engage with the axle flange, on one side, sleeves on the respective arms formed with fingers which embrace the axle flange on the other side, and abutments on said arms which abut against the respective sleeves to hold the fingers in engaging position.

3. A radius rod formed with diverging arms, a yoke connecting said arms together at one end and formed with a bearing, a pintle working through said bearing and having a slidable and a swiveling connection with said yoke, an anchor to which the pintle is hinged, clamp members carried by the other ends of said arms.

4. A radius rod formed with diverging arms, a yoke connecting said arms together at one end and formed with a bearing, a pintle working through said bearing and having a swiveling connection with said yoke a yieldable cushion carried by the pintle and abutting against the yoke, an anchor to which the pintle is hinged, clamp members carried by the other ends of said arms, each clamp member including a hook into which the free end of the arm is formed, a sleeve on said arm formed with engaging fingers opposing said hook, and means abutting against the outer end of the sleeve and locking said fingers in engaging position.

In testimony whereof I have signed my name to this specification.

JAMES A. PORTIS.